United States Patent
Pagan

(10) Patent No.: US 7,461,354 B2
(45) Date of Patent: Dec. 2, 2008

(54) SYSTEM AND METHOD FOR CONSOLIDATING ASSOCIATED BUTTONS INTO EASILY ACCESSIBLE GROUPS

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/390,995

(22) Filed: Mar. 18, 2003

(65) Prior Publication Data

US 2004/0183836 A1    Sep. 23, 2004

(51) Int. Cl.
*G06F 3/00* (2006.01)

(52) U.S. Cl. .................. 715/834; 715/840; 715/841

(58) Field of Classification Search .......... 715/808, 715/814, 817, 818, 819, 820, 841, 843, 828, 715/840, 837, 834
See application file for complete search history.

(56) References Cited

U.S. PATENT DOCUMENTS

| | | | |
|---|---|---|---|
| 5,317,687 A | 5/1994 | Torres | 715/823 |
| 5,442,746 A | 8/1995 | Barrett | 715/854 |
| 5,479,599 A | 12/1995 | Rockwell et al. | 715/837 |
| 5,535,403 A | 7/1996 | Li et al. | 715/853 |
| 5,652,850 A | 7/1997 | Hollander | 715/744 |
| 5,760,774 A | 6/1998 | Grossman et al. | 715/835 |
| 5,767,852 A | 6/1998 | Keller et al. | 715/835 |
| 5,784,061 A | 7/1998 | Moran et al. | 715/863 |
| 5,801,703 A * | 9/1998 | Bowden et al. | 715/841 |
| 5,802,383 A | 9/1998 | Li et al. | 345/420 |
| 5,805,167 A * | 9/1998 | van Cruyningen | 715/808 |
| 5,805,819 A | 9/1998 | Chin et al. | 709/224 |
| 5,821,926 A | 10/1998 | Arita | 715/744 |
| 5,874,956 A | 2/1999 | LaHood | 715/854 |
| 5,926,178 A * | 7/1999 | Kurtenbach | 715/834 |
| 5,977,974 A * | 11/1999 | Hatori et al. | 715/839 |
| 6,003,034 A | 12/1999 | Tuli | 707/101 |

(Continued)

FOREIGN PATENT DOCUMENTS

| | | |
|---|---|---|
| JP | 2001-265482 A | 9/2001 |
| JP | 2002-149323 A | 5/2002 |

OTHER PUBLICATIONS

Microsoft Corporation, Microsoft Excell 2000, 1999, Microsoft Corporation, attached MSExcel figures 1-15.*

(Continued)

*Primary Examiner*—Kieu D. Vu
*Assistant Examiner*—Dennis Bonshock
(74) *Attorney, Agent, or Firm*—Sawyer Law Group LLP

(57) ABSTRACT

A method for consolidating associated buttons on a screen into easily accessible groups includes: a control button and at least one other button that appears when the control button is selected, where the at least one other button is contiguous with the control button. A user can quickly and conveniently select buttons. Furthermore, a significant amount of on-screen real estate is saved because the buttons used are small and square rather than long and rectangular. Further, the configuration of nested menus are such that it takes up little space on the screen. In addition, the menu is ergonomic because the buttons are contiguous, and as such selections can be made without the mouse pointer needing to move very far across the screen.

2 Claims, 7 Drawing Sheets

U.S. PATENT DOCUMENTS

| | | | | |
|---|---|---|---|---|
| 6,011,550 | A | 1/2000 | Capps et al. | 715/788 |
| 6,057,834 | A | 5/2000 | Pickover | 715/846 |
| 6,133,911 | A * | 10/2000 | Kim | 715/719 |
| 6,236,399 | B1 | 5/2001 | Nishiyama et al. | 715/810 |
| 6,239,803 | B1 * | 5/2001 | Driskell | 715/810 |
| 6,384,743 | B1 | 5/2002 | Vanderheiden | 341/21 |
| 2001/0017615 | A1 * | 8/2001 | Lin et al. | 345/173 |
| 2004/0221243 | A1 * | 11/2004 | Twerdahl et al. | 715/834 |

OTHER PUBLICATIONS

"Concise Multi-Icon Representation for Multiple Icons," IBM Technical Disclosure Bulletin, vol. 36, No. 10, Oct. 1993, pp. 345-346.

Cavendish, C.J. et al., "Joined Icons," Kenneth Mason Publications Ltd., England, Jul. 1990, 1 page.

"New Icons," IBM Technical Disclosure Bulletin, vol. 39, No. 10, Oct. 1996, pp. 25-28.

* cited by examiner

SYSTEM AND METHOD FOR CONSOLIDATING ASSOCIATED BUTTONS INTO EASILY ACCESSIBLE GROUPS

FIELD OF THE INVENTION

The present invention relates to graphic user interfaces, and more particularly to a system and method for consolidating associated buttons into easily accessible groups.

BACKGROUND OF THE INVENTION

FIG. 1 is a diagram of a screen 50 including a conventional toolbar 52. The toolbar 52 has selections 54-60. Such selections can include labels such as File, Edit, Insert, Format, for example. When a selection such as Insert 60 is selected, an Insert drop-down menu 62 appears with more selections. A user then moves a mouse pointer (not shown) down the Insert drop-down menu 62 to make another selection. If a selection AutoText 64 is selected, an AutoText drop-down menu 64 appears with more selections. Again, the user moves the mouse pointer down the AutoText drop-down menu 64 to make another selection. If a selection Title 66 is selected, a Title drop-down menu 67 appears with more selections. Finally, a selection of a function Fax 68 executes a function associated with the function Fax 68.

The problem with conventional tool bars is that using them takes up a significant amount of space on the screen. Still referring to FIG. 1, a quarter to a third of the screen is covered with drop-down menus. It is possible that even more of the screen can be covered with drop-down menus, depending on the size of the drop-down menus and/or the number of drop-down menus that are required to reveal a particular selection.

Furthermore, the drop-down menus block text or images in the background, making viewing the background inconvenient if the user needs to refer to such text or images while navigating through the drop-down menus. If the user needs to refer to a portion of the background that is hidden by the drop-down menus, the user needs to clear the drop-down menus.

Furthermore, it is inconvenient and inefficient for a user to have to move the mouse pointer across the screen for long distances. For example, referring to FIG. 1, the mouse pointer does not simply travel from the Insert selection 60 to the function Fax 68. Rather, the mouse pointer must zigzag through the drop-down menus 62, 64, and 67 to get the function Fax 68. If the mouse pointer inadvertently leaves the intended path, e.g., a selection is erroneously made, the mouse pointer must either backtrack or the drop-down menus must be cleared for the mouse pointer to start over.

Accordingly, what is needed is a system and method for making menu selections more efficient. The present invention addresses such a need.

SUMMARY OF THE INVENTION

A system and method for consolidating associated buttons on a screen into easily accessible groups includes: a control button and at least one other button that appears when the control button is selected, where the at least one other button is contiguous with the control button. A user can quickly and conveniently select buttons. Furthermore, a significant amount of on-screen real estate is saved because the buttons used are small and square rather than long and rectangular. Further, the configuration of nested menus are such that it takes up little space on the screen. In addition, the menu is ergonomic because the buttons are contiguous, and as such selections can be made without the mouse pointer needing to move very far across the screen.

DETAILED DESCRIPTION

The present invention relates to graphic user interfaces, and more particularly to a system and method for consolidating associated buttons into easily accessible groups. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Generally, a system and method is provided that enables easy access to buttons by consolidating associated buttons into easily accessible groups. A control button, which is part of a menu, is displayed on a screen. When the control button is selected, one or more other buttons are displayed contiguously with the control button and are available for selection.

When certain conditions are met, e.g., no selection is made, the other buttons retract such that only the control button is displayed. To more particularly describe the features of the present invention, refer now to the following description in conjunction with the accompanying figures.

Figure 2:
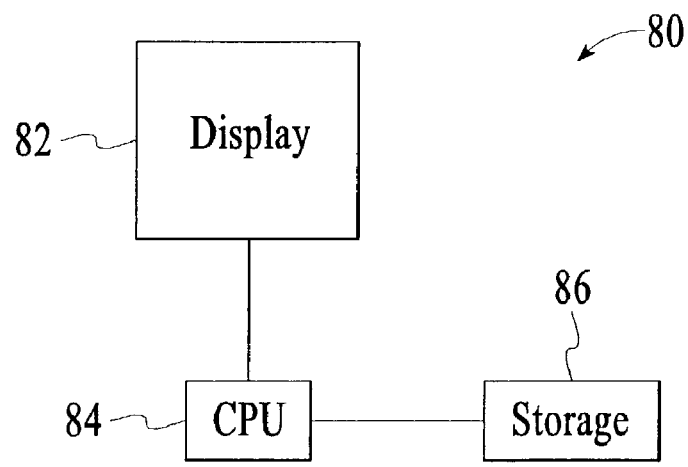
FIG. 2 is a diagram of a computer system comprising a display, a CPU, and storage in accordance with the present invention.

FIG. 2 is a diagram of a computer system 80 comprising a display 82, a CPU 84, and storage 86 in accordance with the present invention. The storage 86 comprises a computer readable medium on which software for operating the present invention can be stored.

Figure 3:
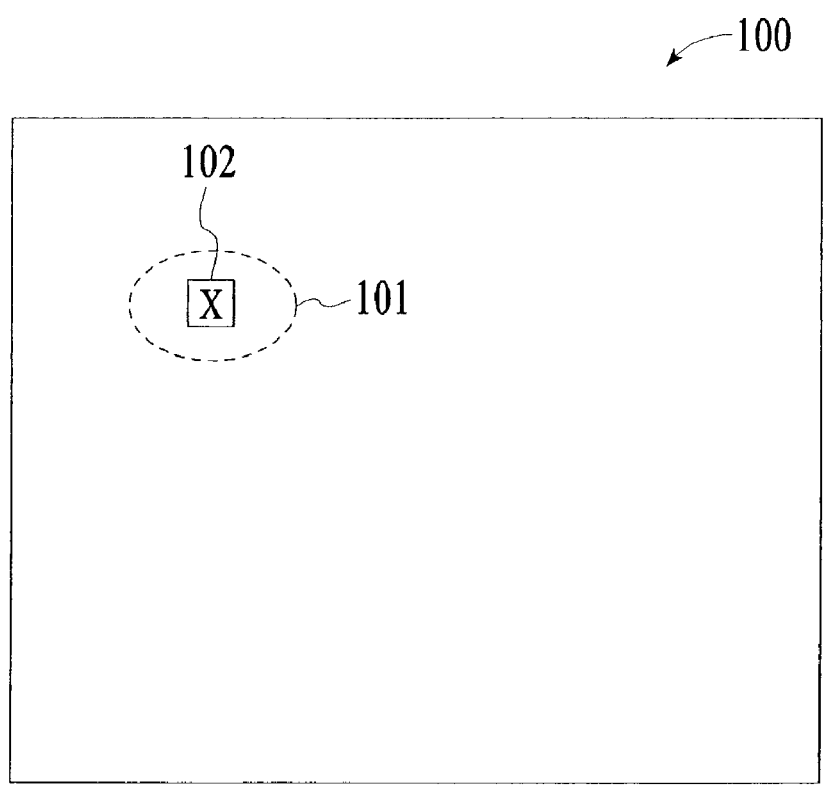
FIG. 3 is a diagram of a screen comprising a menu comprising a control button in accordance with a first embodiment the present invention.

FIG. 3 is a diagram of a screen 100 comprising a menu 101 comprising a control button 102 and at least one other button (not shown) in accordance with a first embodiment of the present invention. The control button 102 is used to control what the menu 101 displays. For example, only the control button 102 is initially displayed. When the control button 102 is selected, the at least one other button will be displayed, as described further below with FIG. 4. Selection of the control button 102 can also be used to retract, i.e., hide, the at least one other button.

Figure 4:
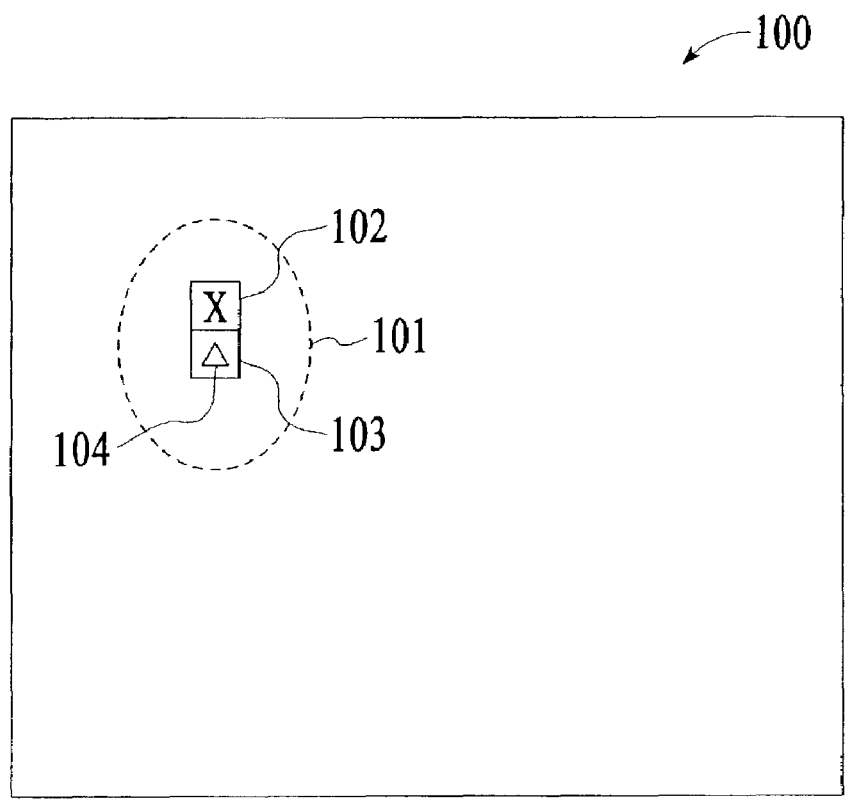
FIG. 4 is a diagram of a screen comprising a menu comprising a control button and one other button in accordance with the present invention.

FIG. 4 is a diagram of a screen 100 comprising a menu 101 comprising a control button 102 and one other button 103 in accordance with the first embodiment of the present invention. The other button 103 is initially retracted and appears when the control button 102 is selected. The other button 103 is contiguous with the control button 102. For example, the other button 103 can share an edge with or simply touch the control button 102. Also, the other button 103 can also be within a button-width's distance from a mouse pointer at the time the control button is selected. The specific configuration can vary and will depend on the specific application. The other button 103 is associated with a label and has an icon 104 that can be selected. The labels comprise, but are not limited to, file, edit, justify, tools, and format functions, and the like. Labels are categories of selections and the labels group associated selections together. The icon 104 can be a picture or text, and the icon 104 can be used to represent the labels.

Figure 5:
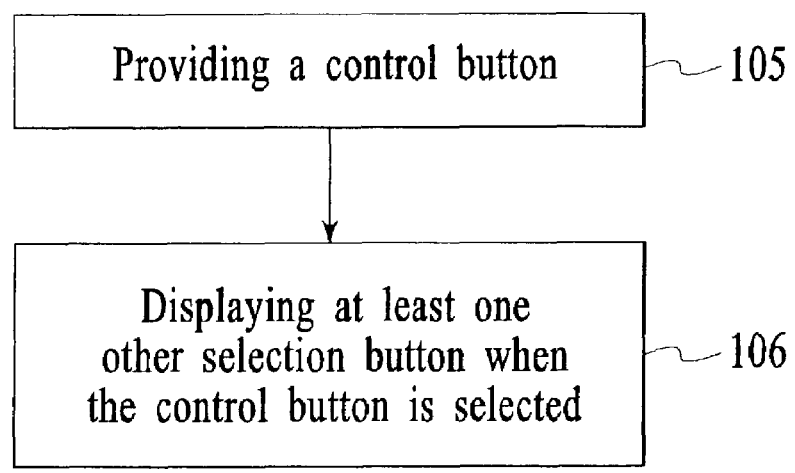
FIG. 5 is a flow chart showing a method for organizing buttons on a menu in accordance with the first embodiment of the present invention.

FIG. 5 is a flow chart showing a method for organizing buttons on a menu in accordance with the first embodiment of the present invention. Referring to FIGS. 3-5, in a step 105, the control button 102 is provided. In a step 106, the at least one other button 103 is displayed when the control button 102 is selected.

Figure 6:
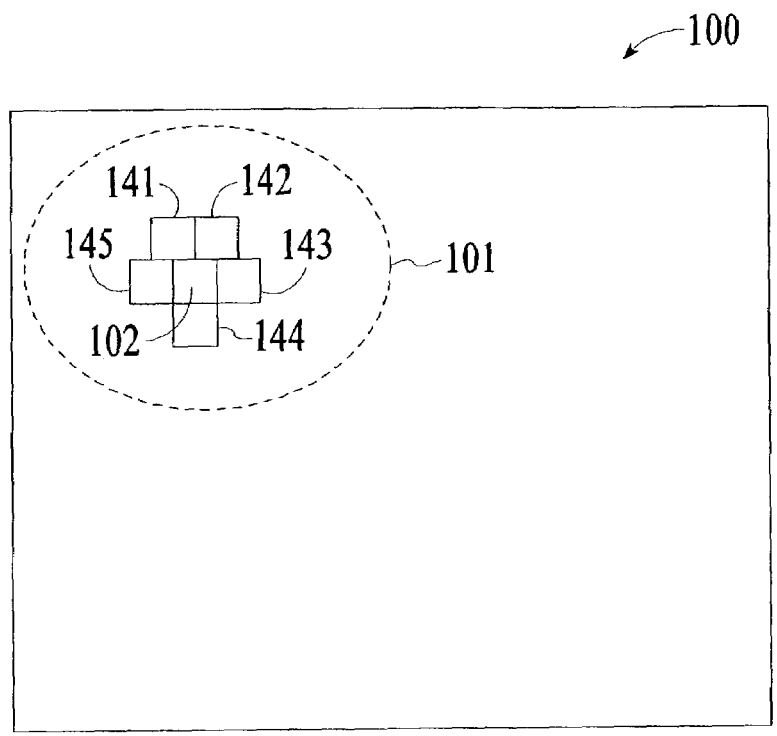
FIG. 6 is a diagram of a screen comprising a menu comprising a control button and five other buttons in accordance with the present invention.

FIG. 6 is a diagram of a screen 100 comprising a menu 101 comprising a control button 102 and five other buttons 141-145 in accordance with the first embodiment of the present invention. The other buttons 141-145 extend radially outward from the control button 102, which acts a central hub. The other buttons 141-145 are also associated with one or more labels and have associated icons, which are not shown for ease of illustration.

The advantage of the single control button 102 is that it takes up very little space on a screen. Also, the single control button 102 makes navigating to the five other buttons 141-145 convenient because they are contiguous with the control button 102. Accordingly, it is ergonomic for a user because the user's hand need not move a mouse very far across a mouse pad.

Figure 7:
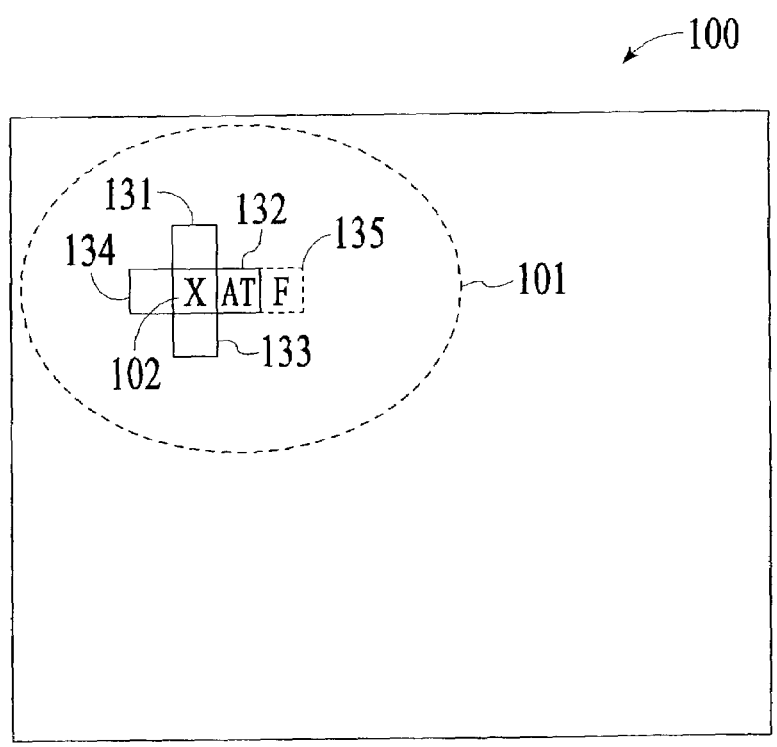
FIG. 7 is a diagram of a screen comprising a menu comprising a control button and four other buttons in accordance with a second embodiment the present invention.

FIG. 7 is a diagram of a screen 100 comprising a menu 101 comprising a control button 102 and four other buttons 131-134 in accordance with a second embodiment of the present invention. In the second embodiment, one or more of the plurality of other buttons 131-134 are themselves control buttons. That is, if one or more of the plurality of other buttons 131-134 is a control button and is selected, at least one other button 135 appears contiguously with that control button. In addition, the at least one other button 135 can itself be another control button.

Figure 8:
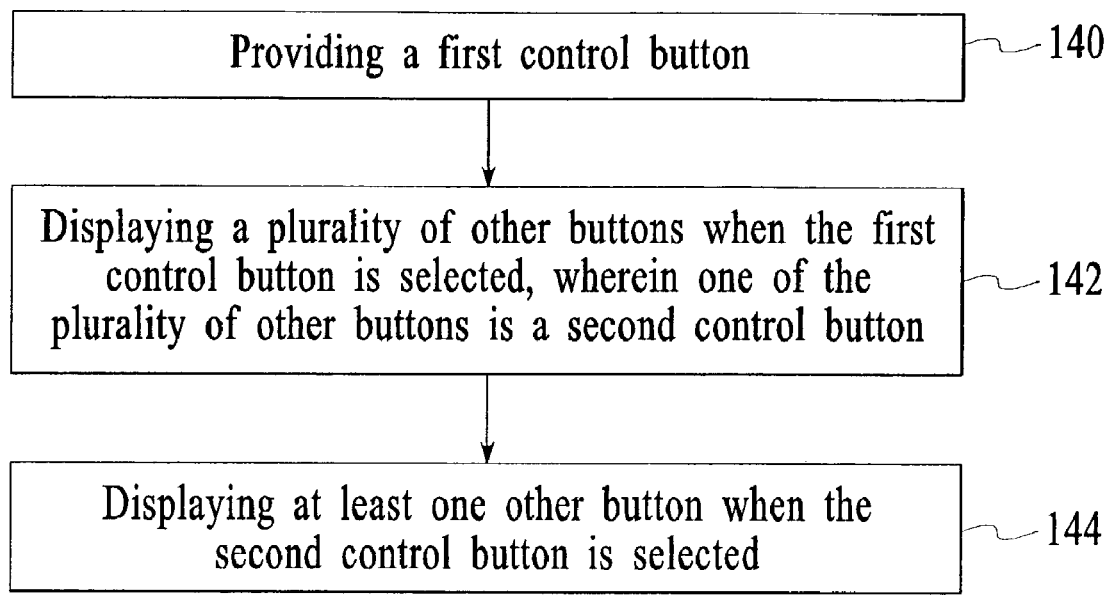
FIG. 8 is a flow chart showing a method for organizing buttons on a menu in accordance with the second embodiment of the present invention.

FIG. 8 is a flow chart showing a method for organizing buttons on a menu in accordance with the second embodiment of the present invention. Referring to FIGS. 7 and 8, in a step 140, the control button 102 is provided. In a step 142, the four other buttons 131-134 are displayed when the control button 102 is selected, wherein at least one of the other buttons 131-134 is another control button. In a step 144, at least one other button 135 is displayed if one of the other buttons 131-134 is another control button and is selected.

In a specific example, still referring to both FIGS. 7 and 8, the button 132 can have a label such as Insert and have an icon such as one representing AutoText, labeled "AT". If the button 132 is selected, an additional button 135 comprising a title theme and a fax icon, labeled "F," can appear and be available for selection.

Figure 1:
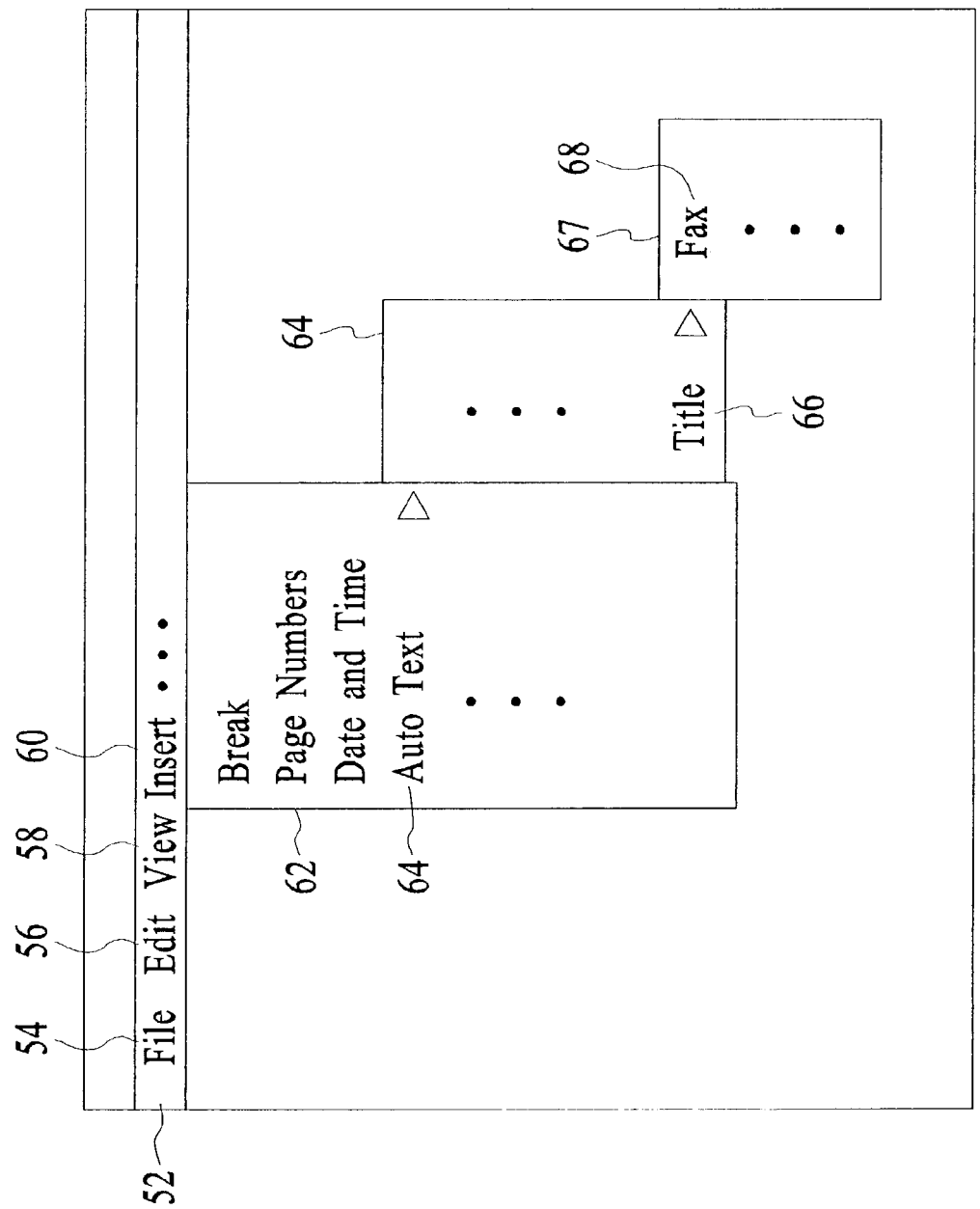
FIG. 1 is a diagram of a screen including a conventional toolbar.

As can be seen, a mouse pointer need not travel very far to select the fax icon. The mouse pointer quickly travels from the control button 102 to the button 132 to the button 135. This is much more efficient than using a conventional tool bar, as described above in FIG. 1, where the mouse pointer zigzags diagonally across the distance of the screen through several drop-down menus to finally arrive at the target selection.

The specific number of other buttons that can appear will depend on the specific application. For example, there could be up to 8 or more other buttons displayed at one time after the control button 102 is initially selected. If certain selections are not available or allowed for any reason, they can be grayed or not appear at all.

The specific shape of the control button 102 and the other buttons 131-134 will depend on the specific application. For example, the control button 102 and the other buttons 131-134 are square. They can also be other shapes, such as other types of polygons, for example. Alternatively, the control button 102 can be square and the other buttons 131-134 can be rectangular such that more than one other button can be placed adjacent to one side of the control button 102.

The menu 101 can later contract such that only the control button 102 is displayed. This occurs when one of several conditions is met. The menu 101 can contract when an icon associated with one of the other buttons 131-134 has been selected. Alternatively, the menu 101 can contract when the mouse pointer leaves the menu 101. Alternatively, the menu 101 can contract when no part of the menu 101 has been selected after a predetermined length of time. This predetermined length of time can vary and can depend on a setting. For example, the predetermined length of time can be up to one second, two seconds, several seconds, or longer. Alternatively, the menu 101 can contract when the control button 102 is selected after the other buttons have been displayed and the control button 102 is selected thereafter.

Figure 9:
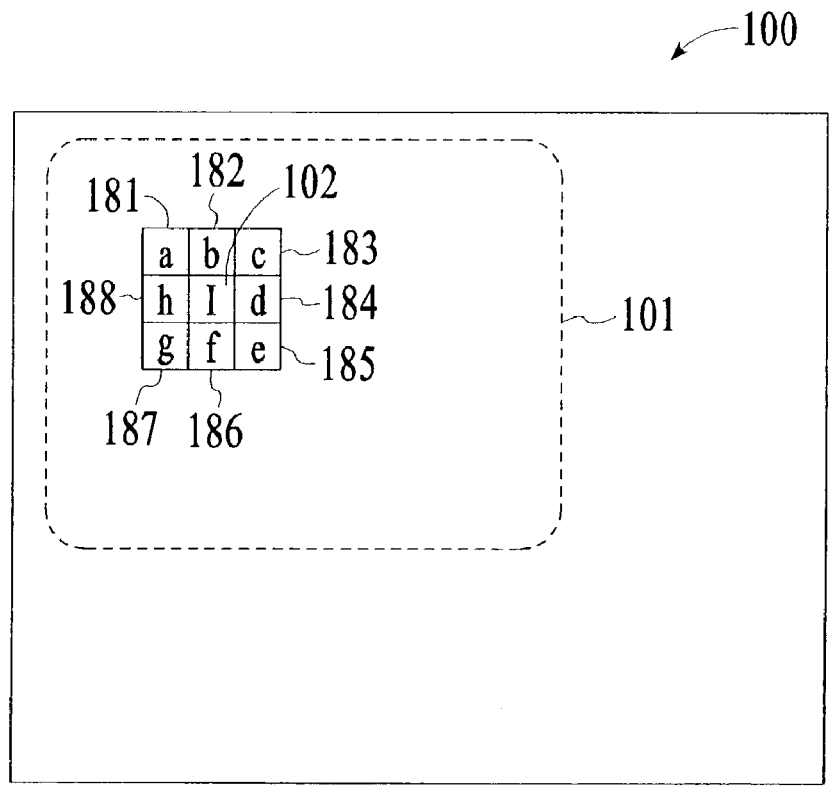
FIG. 9 is a diagram of a screen comprising a menu comprising a control button and eight other buttons of a first menu page, each comprising icons in accordance with a third embodiment the present invention.
Figure 10:
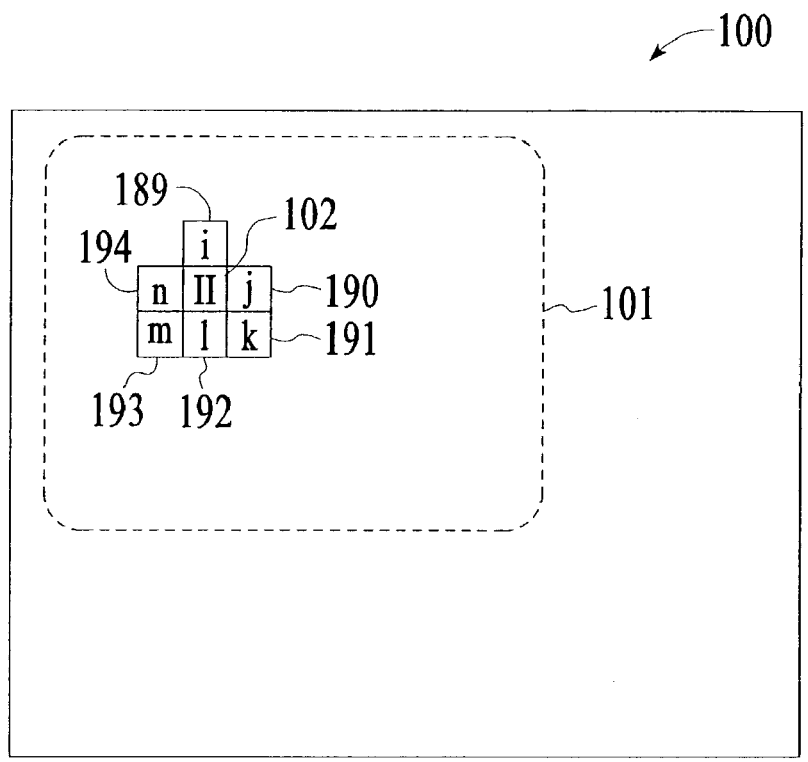
FIG. 10 is a diagram of a screen comprising a menu comprising a control button and six other buttons of a second menu page, each comprising icons in accordance with the present invention.

FIGS. 9 and 10 show a third embodiment where there are two or more menu pages associated with the same control button. A single control button 102 is used to toggle through the menu pages.

FIG. 9 is a diagram of a screen 100 comprising a menu 101 comprising a first menu page, with the first menu page comprising a control button 102 and eight other buttons 181-188, each button comprising icons (labeled a-h, respectively) in accordance with the present invention. In this specific example, there are 14 other buttons total. The control button 102 has an icon labeled "I" to signify a first menu page comprising eight other buttons 181-188. The six remaining other buttons are displayed in a second menu page, shown in FIG. 10 below. While fourteen other buttons are discussed herein, the actual number of other buttons will depend on the specific application.

FIG. 10 is a diagram of a screen 100 comprising a menu 101 comprising a second menu page, with the second menu page comprising a control button 102 and six other buttons 189-194, each button comprising icons i-n, respectively, in accordance with the present invention. The control button 102 has an icon labeled "II" to signify a second menu page. Alternatively, in the third embodiment, the icons a-h on the first menu page can change into a different set of icons i-n on the second menu page, as shown in FIGS. 9 and 10, and vice versa. The control button 102 can be used to toggle between the two menu pages.

Figure 11:
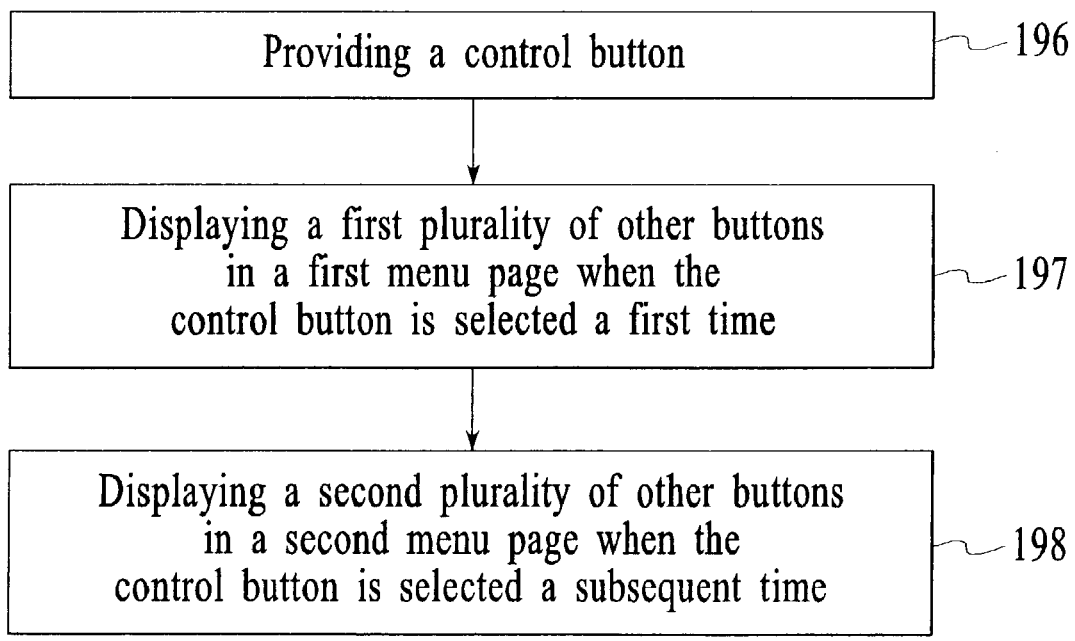
FIG. 11 is a flow chart showing a method for organizing buttons on a menu in accordance with the third embodiment of the present invention.

FIG. 11 is a flow chart showing a method for organizing buttons on a menu in accordance with the third embodiment of the present invention. Referring to FIGS. 9-11, in a step 196, the control button 102 is provided. In a step 197, the plurality of other buttons 181-188 is displayed when the control button 102 is selected. In a step 198, the plurality of other buttons 189-194 is displayed when the control button 102 is selected Alternatively, in the third embodiment, there can be more than two menu pages, and if so, the control button 102 can be used to cycle through these menu pages. Alternatively, in the third embodiment, the control button 102 can cycle through the menu pages and after the last menu page is shown, the menu 101 retracts such that only the control button 102 is shown, as in FIG. 3. Alternatively, in the third embodiment, a right click of a mouse can be used to cycle through the menu pages in one direction, and a left click of the mouse can be used to cycle through the menu pages in the other direction. Alternatively, in the third embodiment, the control button 102 can have two icons. One icon can be used to cycle through the menu pages in one direction and the other icon can be used to cycle through the menu pages in the other direction.

Figure 12:
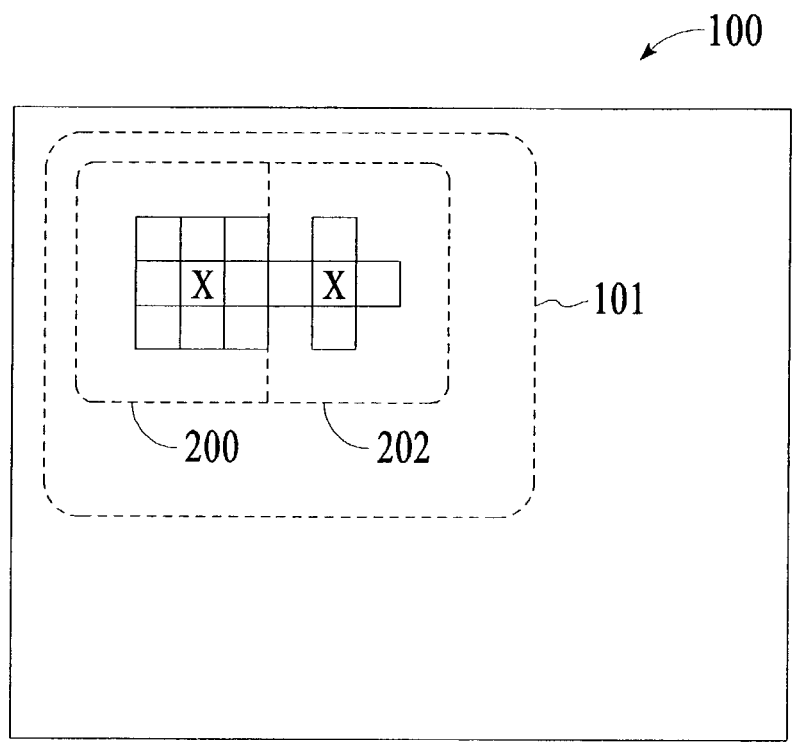
FIG. 12 is a diagram of a screen comprising a menu comprising two menu pages that are displayed simultaneously in accordance with a fourth embodiment the present invention.

FIG. 12 is a diagram of a screen 100 comprising a menu 101 comprising two menu pages 200 and 202 that are displayed simultaneously in accordance with a fourth embodiment of the present invention. As such, the displayed menu pages 200 and 202 are contiguous with one another. The display of the other buttons associated with the control button 102 occurs in the same manner as the first and second embodiments.

Figure 13:
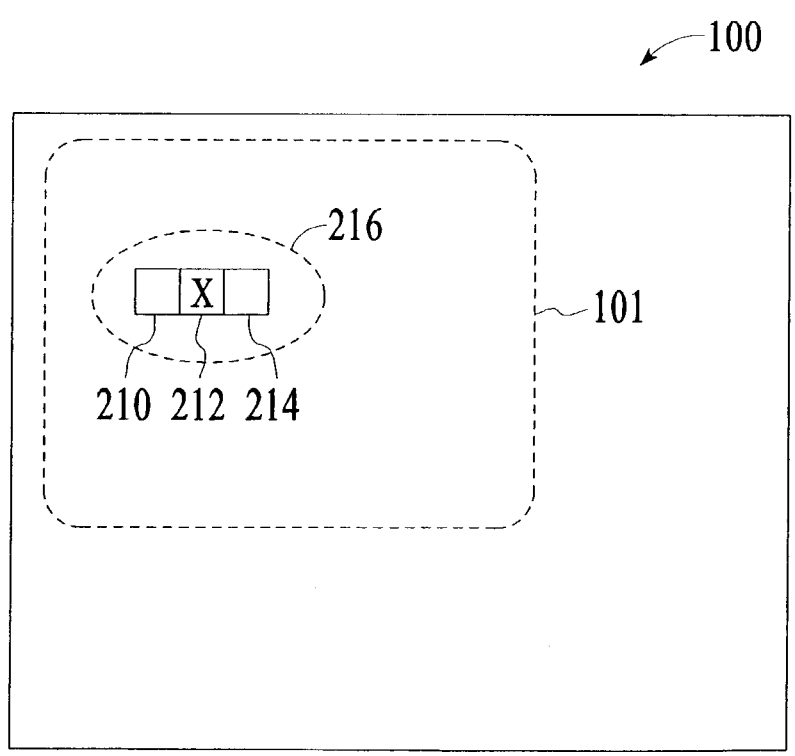
FIG. 13 is a diagram of a screen comprising a menu comprising a plurality of control buttons on a tool bar in accordance with a fifth embodiment the present invention.

FIG. 13 is a diagram of a screen comprising a menu 101 comprising a plurality of control buttons 210-214, organized as a tool bar 216 in accordance with a fifth embodiment the present invention. The control buttons 210-214 function in the same manner as the control button(s) of the first and second embodiments.

In conclusion, a system and method is provided that enables easy access to buttons by consolidating associated buttons into easily accessible groups. A control button, which is part of a menu, is displayed on a screen. When the control button is selected, one or more other buttons are displayed contiguously with the control button and are available for selection. When certain conditions are met, e.g., no selection is made, the other buttons retract such that only the control button is displayed. To more particularly describe the features of the present invention, refer now to the following description in conjunction with the accompanying figures.

According to the system and method disclosed herein, the present invention provides numerous benefits. A user can quickly and conveniently select buttons. Furthermore, a significant amount of on-screen real estate is saved because the button configuration is such that it takes up little space on the screen. Furthermore, the menu is ergonomic because the buttons are contiguous, and as such selections can be made without the mouse pointer comprising to move very far across the screen.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for organizing buttons on a menu, the method comprising:
   providing a single icon control button;
   displaying a plurality of buttons on a first menu page when the control button is selected, wherein each button of the plurality of buttons touches the control button;
   displaying at least a second menu page that appears when the control button is selected a first subsequent time, wherein the second menu page touches at least one button in the first menu page;
   displaying at least a third menu page that appears when the control button is selected a second subsequent time, wherein the control button is used to cycle through the menu pages, wherein a right click of a mouse can be used to cycle through the menu pages in one direction, wherein a left click of the mouse can be used to cycle through the menu pages in the other direction, and wherein at least two menu pages are displayed simultaneously; and
   hiding the plurality of buttons if the control button is selected a third subsequent time and the plurality of buttons have been displayed.

2. The method of claim 1 wherein the hiding step further comprises the step of hiding the plurality of buttons after a predetermined time if a mouse pointer leaves the menu and no buttons have been selected.

* * * * *